United States Patent [19]

Nishijima et al.

[11] 4,358,797
[45] Nov. 9, 1982

[54] ELECTRONIC EDITING CONTROL APPARATUS FOR A VIDEO TAPE RECORDER

[75] Inventors: Hideo Nishijima; Isao Fukushima; Hajime Yokota, all of Katsuta, Japan

[73] Assignee: Hitachi, Ltd., Tokyo, Japan

[21] Appl. No.: 123,644

[22] Filed: Feb. 22, 1980

[30] Foreign Application Priority Data

Feb. 23, 1979 [JP] Japan .............................. 54-19786

[51] Int. Cl.$^3$ .................... H04N 5/78; G11B 27/08
[52] U.S. Cl. .................................... 360/14.2; 360/73
[58] Field of Search .................. 360/14, 85, 71, 73, 360/70

[56] References Cited

U.S. PATENT DOCUMENTS

| | | | |
|---|---|---|---|
| 3,674,942 | 7/1972 | Sugaya et al. | 360/85 |
| 3,742,132 | 6/1973 | Sanguu et al. | 360/14 |
| 3,772,468 | 11/1973 | Tatsuguchi | 360/14 X |
| 3,939,491 | 2/1976 | Shigeta | 360/14 |
| 3,965,483 | 6/1976 | Katoh et al. | 360/14 |
| 3,974,522 | 8/1976 | Fukatsu et al. | 360/14 |
| 4,115,819 | 9/1978 | Shigeta | 360/14 |
| 4,121,267 | 10/1978 | Hayashi et al. | 360/85 |
| 4,163,263 | 7/1979 | Rotter | 360/14 |
| 4,210,939 | 7/1980 | Ninomiya et al. | 360/14 |
| 4,214,278 | 7/1980 | Hunt et al. | 360/14 |

Primary Examiner—Bernard Konick
Assistant Examiner—Donald McElheny, Jr.
Attorney, Agent, or Firm—Antonelli, Terry & Wands

[57] ABSTRACT

When operation mode is switched from recording to pause mode, a magnetic tape on which signals were recorded previously is slightly rewound backward by a predetermined length and is maintained in the pause mode operation state. When the pause condition is released, reproducing operation is performed to detect a phase difference between the reproduced control signal and a control signal of a video signal to be newly recorded. The tape speed is rapidly changed in accordance with the detected phase difference, so that the phase difference between the reproduced control signal and the control signal to be recorded is reduced to zero. Then, when a discontinuous scene recording is performed by switching from pause to recording operation mode, the phase coincidence has been achieved thereby enabling the phase-coincidence recording of video signals. Thus, upon reproducing, a clear picture with no disturbance can be presented even at the interconnection of signals for different scenes.

2 Claims, 10 Drawing Figures

ELECTRONIC EDITING CONTROL APPARATUS FOR A VIDEO TAPE RECORDER

BACKGROUND OF THE INVENTION

The present invention relates to video-signal recording and/or reproducing apparatus, and particularly to a helical-scan type magnetic recording and/or reproducing apparatus suitable for electrical editing of a magnetic tape without cutting and splicing the magnetic tape.

At present, two-head helical scan type video tape recorders are widely used for home video-signal recording and/or reproducing apparatus. In such video tape recorders, the record tracks for video signals are obliquely formed on the magnetic tape at a small angle with respect to the lengthwise direction of the tape. In two-head video tape recorders, each track normally contains one field of a television signal. The recent home video tape recorders generally form tracks which are each 100 μm or less wide, and have no guardband between the adjacent tracks. Moreover, the magnetic tape used is generally a tape cassette which can be easily handled by any person. Therefore, it is in effect impossible to cut and splice the magnetic tape for editing the tape. Any necessary editing of the tape must be performed by continuously recording a plurality of video signals in the form of electrical signals on a single roll of magnetic tape. In addition, although the currently used tape cassette, which includes one roll of magnetic tape, is capable of about two hours of continuous recording, it is extremely rare to pick up scenes for two hours running when picture images of the scenes are recorded by the use of a video camera. That is, the picture images are divided into individual different scenes so that they are discontinuously or interruptedly picked up and recorded on the tape cassette.

In such interruption of recording (which will be referred to as discontinuous scene recording in this specification), a so-called record pause condition, for example, is effected under which only the magnetic tape is caused to stop running and the other mechanisms or parts are maintained in the recording state. When the next scene is desired to be picked up, the pause condition is released and followed by the recording condition. Thus, the discontinuous scene recording is performed by repetitions of the pause and recording states. This pause-record repetition operation is performed not only when using a video camera but also when another video apparatus is used to supply video signals which are to be edited on a single roll of magnetic tape. The pause condition is achieved usually by stopping the drive of the take-up reel and disengaging the pressure roller, which is pressing the magnetic tape against the capstan, from the capstan. When the operation mode is changed from recording to pause condition and then from pause to recording condition, it is difficult to completely stop the magnetic tape at the end of recording, and thus, the tape often slightly excessively moves further to the point at which the magnetic tape should be stopped. FIGS. 1a and 1b show record patterns on the magnetic tape when the magnetic tape is unnecessarily moved upon the repetition of record, pause and record operation modes for a discontinuous scene recording.

In FIGS. 1a and 1b, there are shown an audio-signal track 17 formed along one side edge of the magnetic tape, and a control-signal track 20 formed along the other side edge thereof. A sequence of slant elongated rectangles lying between the audio track 17 and control track 20 are alternate video signal tracks 18 and 19 of which the track 18 (a track for channel 1) is formed by one of the two video heads, and the track 19 (a track for channel 2) by the other head. For easy understanding, the track 19 for channel 2 is indicated by hatched areas. FIG. 1a shows occurence of unrecorded area between the recorded areas before and after the pause, and FIG. 1b shows an overlapped area in which the beginning of the recording after the pause is superposed upon the previously recorded area. In the case of FIG. 1a, only noise appears on the whole picture screen when the unrecorded area is reproduced, and in addition since the last portion 20a of the control signal recorded on the control track 20 just before the pause is not in phase with the initial portion 20b of the control signal after the pause, a synchronized picture can not be presented on the screen until the automatic control becomes stabilized in the tape transporting system and rotary head phase control system. In the case of FIG. 1b, although the reproduced picture does not completely disappear, the signal-to-noise ratio becomes reduced, and since the control signals are not in phase with each other at the recorded portions 20a and 20c before and after the pause similarly as in FIG. 1a, a synchronized picture can not be presented on the screen until the automatic control is stabilized, either.

To solve the problem, the following method may be considered. A part of the tape on which video signals has been recorded is rewound to a sufficient degree and is then played back to produce a control signal with which the synchronizing signal of a newly recorded signal is phase-compared, and the tape speed is controlled so that the phases of both signals coincide with each other. After the phases become coincident with each other, switching is made from the reproducing to the recording mode in which the phases of recorded signals are thus identical. In this method however, since the phase coincidence can be achieved by automatic control of the tape speed, it takes a relatively long time to reach the phase coincidence. As a result, when the next scene is picked up and recorded after the picking-up of a scene has been completed by a video camera, since a long time is required for the phase coincidence and since such delay time is not constant, various troubles occur, such as missing of a good timing at which to start recording and the missing of necessary chance at recording.

SUMMARY OF THE INVENTION

Accordingly, it is an object of the present invention to provide a novel magnetic recording and/or reproducing apparatus capable of easy electrical editing and presenting stable picture without noise and disturbed synchronization when reproduction is made on the connection between the record tracks for discontinued individual scenes which have been formed by the repetition of record, pause and record operation modes, namely the discontinuous scene video recording.

To achieve the above object, the apparatus of the present invention is constructed as follows. When a pause operation is performed during recording, the magnetic tape is not merely stopped, but it is rewound backward by a predetermined, slight length and then stopped. When recording starts from the pause condition, the control signal is reproduced from the recorded control track and phase-compared with the control signal of a newly recorded signal. The phase difference therebetween is detected and the speed of the capstan motor for the tape drive is controlled to rapidly change in accordance with the phase difference to the effect that the phase difference becomes zero. Thus, the recording operation mode is ready to be switched to.

The apparatus of the present invention is characterized in that the required length of tape rewound in the pause condition is very small because the phase difference can be detected under the reproduction of at least a single control pulse previously recorded, and thus the next recording operation can be started in a short time without missing of a chance of picking up another scene in the discontinuous scene recording. Therefore, since the recorded signals, including control signals, before and after the interconnected parts formed by the discontinuous scene recording are in phase with each other, there occur no noise and no disturbed picture upon reproduction.

DESCRIPTION OF THE PREFERRED EMBODIMENTS

Figure 1A:
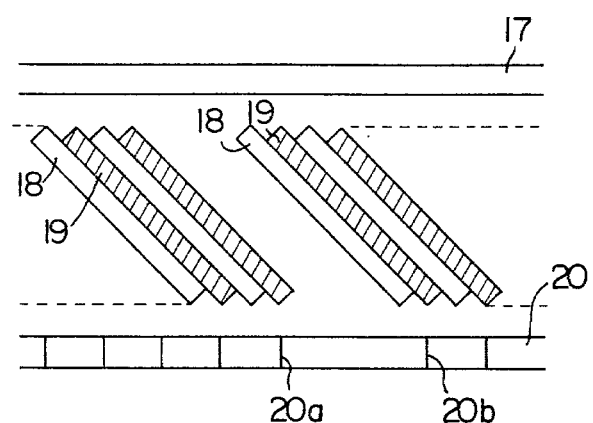
FIGS. 1a and 1b schematically show record patterns each of two cycles of recording.
Figure 1B:
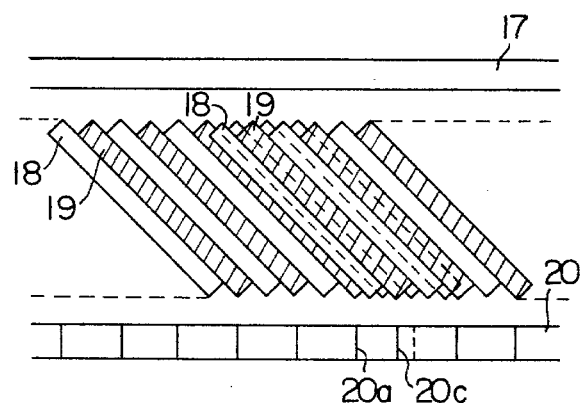
Figure 2:
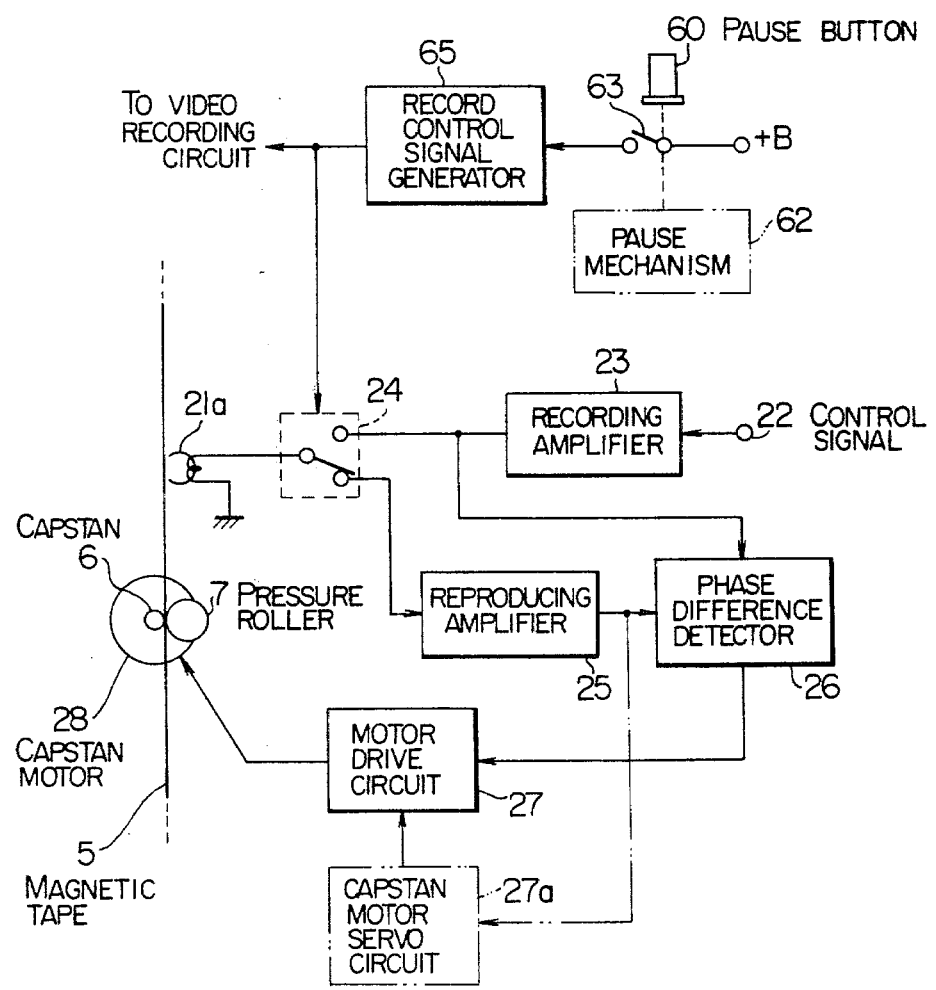
FIG. 2 is a block diagram showing main parts of an embodiment of the present invention.

FIG. 2 is a block diagram of the main parts of one embodiment of the invention. Shown at 60 is a push button for pause operation. When this push button or pause button 60 is depressed, a pause mechanism 62 is actuated and the operations as will be described later are performed.

First, description will briefly be made of a normal recording and reproducing mechanism.

Figure 3:
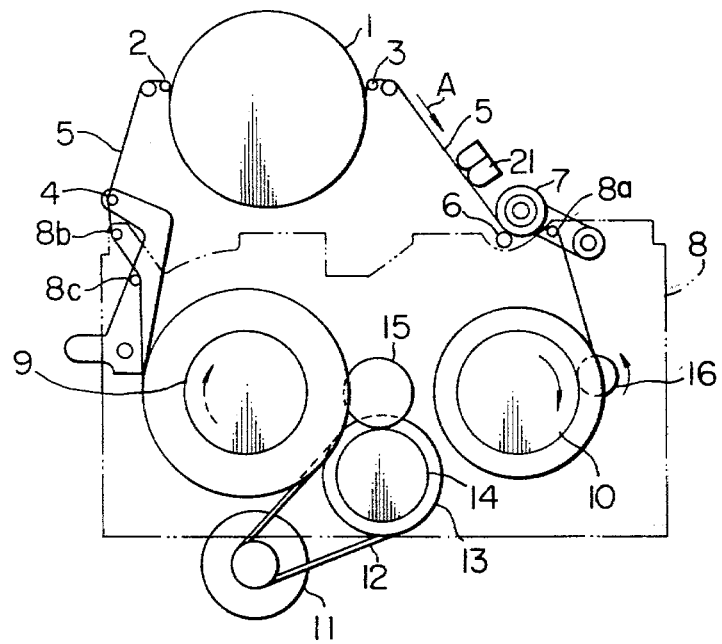
FIGS. 3 to 5 are schematical plan views of a tape driving mechanism to which reference is made in explaining the operation of the invention.

FIG. 3 is a schematical diagram of the magnetic tape drive system of a cassette video tape recorder as a magnetic recording and/or reproducing apparatus, in the recording mode. Referring to FIG. 3, there is shown a rotating head assembly 1 formed of rotary heads and a cylindrical tape guide. To form slant record tracks on a magnetic tape 5, the asembly 1 is normally disposed such that its axis is inclined with respect to the direction perpendicular to the chassis plane. In this illustration, the assembly 1 is not inclined for simplicity. In the recording or reproducing mode, loading pins 2 and 3, which are located at the opening of a csssette 8 when the recorder is not operated, are moved to the positions as shown in FIG. 3 so as to pull out the magnetic tape 5 from the cassette 8 and fix it at the periphery of the rotating head assembly 1. Then, a pinch roller or pressure roller 7 presses the tape 5 against a rotating capstan 6, by which the magnetic tape 5 is moved around the rotating head assembly 1 in the direction of the arrow A. The magnetic tape 5 thus driven by the capstan 6 and pressure roller 7 is wound on a take-up reel 10 which is driven by a rotative roller 16 pressing the reel stand. Shown at 4 is a tension pin which is provided on a lever urged by a spring (not shown) to exert a back or rearward tension on the magnetic tape 5 during recording or reproducing operation. Shown at 21 is a stationary head including an audio head for recording or reproducing an audio signal and a control head for recording and reproducing a control signal. The video tape recorder having such mechanism is already known and thus in this specification the detailed description thereof will be omitted. The loading pins 2 and 3 for drawing out the magnetic tape 5 from the cassette 8 and fixing it at the periphery of the assembly 1 can be replaced by other known means. The present invention can also be applied to the video tape recorder including such other known means.

The pause operation will be described which is one of the features of the present invention.

When the pause button 60 is pushed for the recording mode, the pressure roller 7 is disengaged from the capstan 6 and at the same time the rotative roller 16 is separated from the take-up reel stand, so that the tape stops running. Then, in this invention, the magnetic tape 5 wound on the take-up reel 10 is slightly rewound back to a supply reel 9 and the pause condition is maintained. This slight rewinding is performed as follows.

Figure 4:
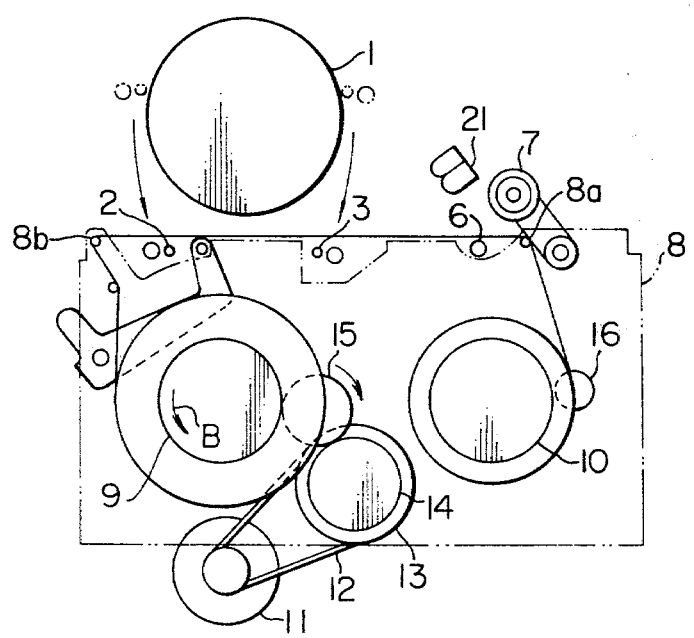
Figure 5:
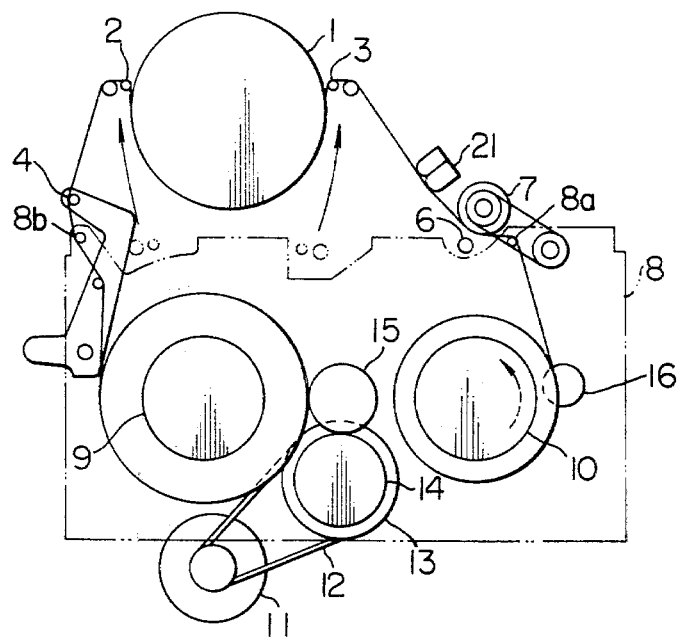

After the magnetic tape 5 has been stopped, the loading pins 2 and 3 are once returned to the cassette 8 as shown in FIG. 4. The magnetic tape, at this time, is tensioned by the supply reel 9 through the fast winding and backward rewinding mechanism. Specifically, the rotation of a reel motor 11 is transmitted through a belt 12 to a pulley 13 which then transmits the rotational force through a slip mechanism to a roller 14 which is disposed concentric with the pulley 13. This roller 14 is engaged with an idler 15 which is pressed against the reel stand of the supply reel 9, and thus the supply reel 9 is rotated in the arrow B direction as shown in FIG. 4 so as to draw the magnetic tape 5. When the magnetic tape 5 between guide pins 8a and 8b in the cassette 8 is tensioned, the idler 15 is disengaged from the reel stand of the supply reel 9 as shown in FIG. 5, and again the loading pins 2 and 3 are moved from the positions at the opening of the cassette 8 so that the magnetic tape 5 is fixed around the rotating head assembly 1. At this time, the magnetic tape 5 drawn out of the cassette 8 can be supplied from only the take-up reel 10 by braking (not shown) only the supply reel 9. Thereafter, the magnetic tape 5 is put in the loading condition under which it is fixed around the rotating head assembly 1, and the pressure roller 7 is separated from the capstan 6 with the rotative roller 16 released from pressing against the reel stand of the take-up reel 10. Thus, the video tape recorder is temporarily maintained at the pause condition. As described above, when the pause operation has been performed, a certain length of magnetic tape is reversely supplied from the take-up reel 10 to the supply reel 9. The idler 15 is usually brought into rotative contact with the reel stand of the supply reel 9 or take-up reel 10 in response to the switched rotational direction of the reel motor 11 so as to effect rewinding or fast feeding of the tape.

While the small length of rewinding of the tape 5 upon the pause operation is achieved by the loading and unloading of the tape as described above, the capstan 6 may be reversely rotated for a constant time with the magnetic tape 5 left loaded thereby to make the supply reel 9 be reversely rotated, effecting the similar rewinding operation.

In order to restore the video tape recorder from the pause condition to the recording mode, the pause button is simply unlocked. As a push button suitable for such operation, a well-known push button mechanism can be used which is released from the locked state by again pushing the locked button.

Figure 6:
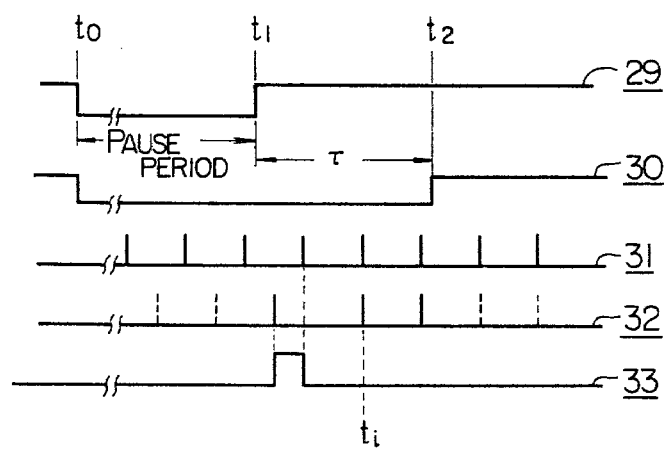
FIG. 6 is a timing chart useful for explaining the operation of the circuit of FIG. 2.

Operation of the recorder according to the invention in the case where the pause condition is released and recording starts will be described with reference to FIG. 2 and the timing chart of FIG. 6.

When the pause button 60 is unlocked, the pause mechanism 62 causes release of the temporary stop, and therefore the tape driving system is readily returned to the condition as shown in FIG. 3 to drive the magnetic tape 5. At this time, the electrical circuits of the video tape recorder are not switched immediately to the recording state, but remains in the reproducing state for a predetermined time. The switching of the modes of operation is controlled by a switch 63 which is turned on or off in association with the pause button 60, and a record control signal generator 65. For example, the switch 63 may be turned off while the pause button 60 is being pushed or locked, and turned on in the other period of time to supply a high level of voltage, so that a switch signal 29 as shown in FIG. 6 is generated when the switch 63 is closed. In FIG. 6, at time $t_0$, the pause operation is started and at time $t_1$ the pause condition is terminated. The record control signal generator 65 generates a record start signal 30 which rises up a delay time $\tau$ after the pause condition has been released and the switch signal 29 has been produced. This record start signal 30 can be easily generated by a delay circuit constituted by a well-known monostable multivibrator. When this signal 30 is at a low level, a switch circuit 24 for the control head is operated to connect the reproduced output from a control head 21a to a reproducing amplifier 25. In addition, the record start signal 30 is applied to a video recording circuit to inhibit the recording operation when the signal 30 is at a low level. Thus, even when the magnetic tape 5 is driven after the pause condition is released, recording operation is not initiated but reproducing operation is maintained until time $t_2$ is reached after the lapse of time $\tau$.

To a terminal 22 is supplied a control signal 31 which is derived by known means from the vertical synchronizing signal of a video signal to be recorded. This control signal 31 is applied through a recording amplifier 23 to the switch circuit 24 and a phase difference detector 26. Thus, just after the pause condition is released, the previously recorded control signal is read by the control head 21a and supplied to the reproducing amplifier 25. A reproduced control signal 32 from the reproducing amplifier 25 is applied to the phase difference detector 26 where the phase difference between the signal 32 and another control signal 31 of a video signal to be recorded is detected. The detected output is a signal 33 having a duration corresponding to the phase difference between the control signals as shown in FIG. 6. This signal 33 is applied to a motor drive circuit 27 by which a capstan motor 28 is rapidly decelerated or accelerated for a time corresponding to the duration of the detected output 33 or the phase difference. The deceleration can be made by, for example, applying a reverse current to the motor 28 for reversely rotating the capstan motor 28 during the time corresponding to the phase difference. Thus, the capstan motor speed is rapidly reduced so that at time $t_i$ as shown in FIG. 6 the control signal 31 of a signal to be newly recorded becomes in phase with the reproduced control signal 32. The magnitude of the reverse current is preset to an optimum value in accordance with a motor and tape drive system used in the recorder by experiment or the like so that the phase difference becomes zero by decelerating for the time corresponding to the phase difference. In addition, the motor drive circuit 27 should be provided with a switching means which is operated to pass current from a reverse current source to the capstan motor 28 while the pulse signal 33 is being supplied.

After the previously recorded control signal has been in phase with a control signal to be newly recorded, the record control signal generator 65 produces at time $t_2$ the record start signal 30 and supplies it to the switch 24, which is then operated to allow passing of the control signal associated with a newly applied video signal. Accordingly the control head 21a records the received control signal on the tape 5. At the same time, the video recording circuit is also actuated by the record start signal 30, so that a new video signal is recorded.

This rapid speed control for the capstan motor 28, which control is performed for phase coincidence in the discontinuous scene recording, is carried out once for each discontinuous scene recording. When the detected output signal 33 is not applied from the phase difference detector 26 to the capstan motor 28, the speed of the motor 28 is controlled by a well-known capstan motor servo circuit 27a so that it stably rotates.

Figure 7:
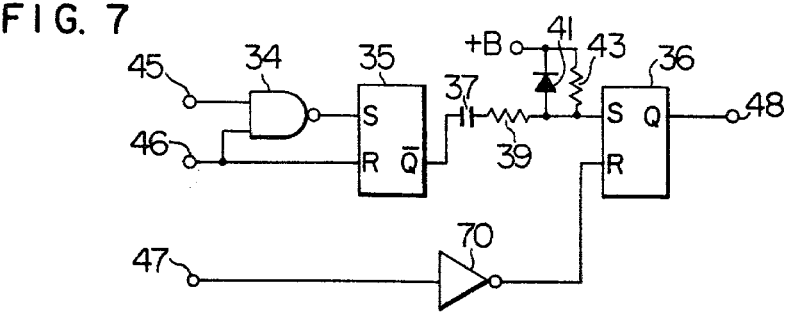
FIG. 7 is a circuit diagram showing one example of the phase difference detecting means.

FIG. 7 is a circuit diagram of a specific arrangement of the phase difference detector 26 as a feature of the present invention. This circuit 26 functions to generate a pulse signal and supply it to the capstan motor 28 thereby rapidly changing the speed of the capstan motor 28 to make the phase difference zero just after the pause condition has been released for the discontinuous scene recording. The operation of the circuit of FIG. 7 will hereinafter be described with reference to the timing chart of FIG. 8.

Figure 8:
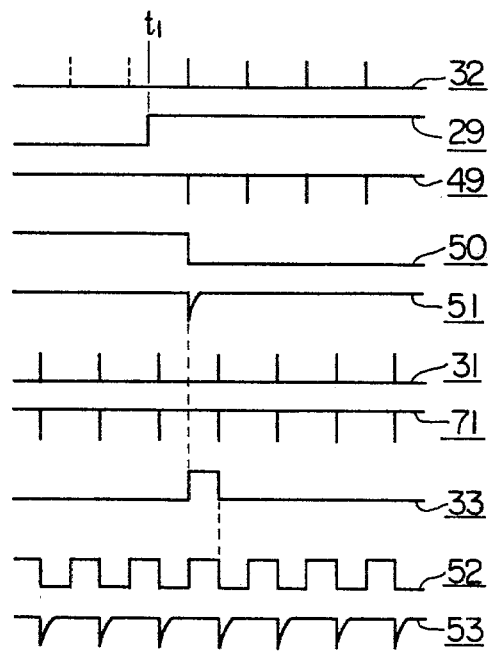
FIG. 8 is a timing chart useful for explaining the operation.

The reproduced control signal 32 from the reproducing amplifier 25 as shown in FIG. 2 is applied through a terminal 45 to one input terminal of a NAND gate 34. This reproduced control signal 32 appears after the pause condition has been released, and of course it does not appear during the pause period in which the tape is not driven. The switch signal 29 from the switch 63 which is operated in association with the pause button is applied through a terminal 46 to the other input terminal of the NAND gate 34. Consequently, the NAND gate 34 produces a signal 49, as shown in FIG. 8, which is similar to the reverse of the reproduced control signal 32. This signal 49 is applied to the set terminal S of an RS flip-flop circuit 35, and the switch signal 29 from the terminal 46 is applied to the reset terminal R. If it is assumed that the RS flip-flop circuit 35 is triggered by the trailing edge of an applied signal, since the switch signal 29 as shown in FIG. 6 falls off at the time of the pause, the flip-flop circuit 35 having already been reset is, as shown in FIG. 8, set by the first pulse of the signal 49 from the NAND gate 34. Accordingly, the Q-output waveform is as shown by a signal 50. This Q-output signal 50 from the flip-flop circuit 35 is differentiated by a differentrating circuit of a capacitor 37 and a resistor 43 to produce therefrom a differentiated signal 51, which is then applied to the set terminal of a flip-flop circuit 36. The resistor 39 of the differential circuit and a diode 41 are used as protective elements. The control signal 31 of a video signal to be newly recorded is applied through a terminal 47 to an inverter 70, which then produces an inverted signal 71. This inverted signal 71 is supplied to the reset terminal of the flip-flop circuit 36. If the flip-flop circuit 36 is triggered by the trailing edge of an input signal, the flip-flop circuit 36 produces at the Q-output terminal the pulse signal 33 which rises up at the differentiated signal 51 and falls off at the first pulse of the inverted control signal 71 as shown in FIG. 8. This signal 33, as is apparent from FIG. 8, is a pulse signal of a duration corresponding to the phase difference between the reproduced control signal and the new control signal. This pulse signal 33 is supplied through an output terminal 48 to the motor drive circuit 27 as shown in FIG. 2 so as to rapidly change the rotational speed of the capstan motor.

There has been proposed a video tape recorder constructed such that the recording amplifier 23 is not operated during reproducing operation because, in FIG. 2, in the normal reproducing condition under which the control signal from the control head 21a is reproduced with the switch 25 operated therefor, the operation of the recording amplifier 23 may sometimes allow the control signal from the recording amplifier 23 to leak through the switch 24 to the reproducing amplifier 25, which results in the operation of the servo system being unstable.

Figure 9:
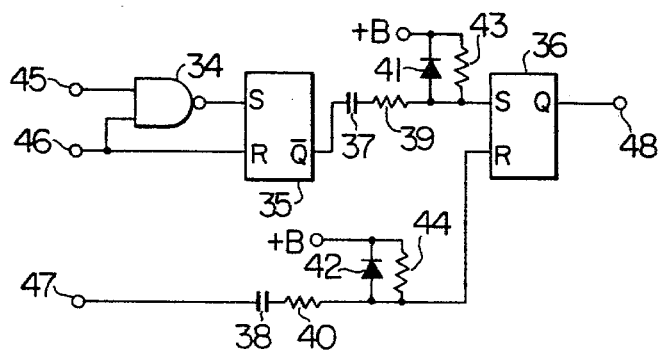
FIG. 9 is a circuit diagram of another example of the phase difference detecting means.

In order to use the present invention in such a video tape recorder, it is necessary to employ a head switching signal for rotary heads in place of the control signal of a signal to be newly recorded. FIG. 9 shows a specific example of the phase difference detecting circuit suitable for this case. The circuit shown in FIG. 9 differs from that of FIG. 7 in that the inverter 70 for applying a signal to the reset terminal of the flip-flop circuit 36 is replaced by a differentiating circuit. A head switching signal 52, as shown in FIG. 8, which is produced in response to rotation of the rotary head is applied to the terminal 47. This head switching signal 52 is differentiated by a differentiating circuit of a capacitor 38 and a resistor 44, and is applied to the reset terminal of the flip-flop circuit 36 as a differentiated signal 53 as shown in FIG. 8. A resistor 40 and a diode 42 are used as protective elements. In the recording condition, the rotary servo system for the rotary head usually makes phase locking of the control signal of a recorded signal with the head switching signal for the rotary head. Therefore, it is possible to obtain the signal 33 of a pulse duration corresponding to the phase difference by employing the head switching signal in place of the control signal of a recorded signal, similarly as in FIG. 7.

This detected pulse signal 33 corresponding to the phase difference is produced for a very short time just after the pause condition has been released as described above, to thereby change the tape running speed rapidly so that the control signal previously recorded can readily be in phase with a signal to be newly recorded. Thus, upon the pause operation, part of the magnetic tape which has already been recorded is rewound back by a length corresponding to about 0.1 second, namely 3 to 4 mm in the home video tape recorder wherein the tape speed is about 33 mm/sec.

We claim:
1. An electronic editing control apparatus for use with a video signal recording and reproducing apparatus of the type including a capstan motor, servo control means for producing a servo control signal to control said capstan motor and effect driving of a magnetic tape, pause means responsive to a pause instruction issued during a signal recording operation for stopping the recording operation and holding the recording and reproducing apparatus in a pause state for a reproducing operation including rewinding a predetermined length of the magnetic tape, and means responsive to removal of said pause instruction for effecting playback of said rewound tape to reproduce a first control signal therefrom, the editing control apparatus comprising:
   means for comparing the phase of said first control signal and that of a second signal of a signal to be recorded subsequent to said pause instruction to produce a phase difference signal therebetween;
   means for producing a pulse current signal having a polarity and a duration corresponding to said phase difference signal;
   means for supplying said pulse current signal to said capstan motor in place of said servo control signal only for a time period corresponding to said duration of said phase difference signal for effecting phase-synchronization between said first and second control signals; and
   means responsive to said removal of said pause instruction for producing a recording operation re-start signal a predetermined time after said pause instruction removal, the length of said predetermined time being such that said production of said phase difference is carried out before said production of said recording operation re-start signal, whereby a video signal may be recorded in succession to a recorded video signal on the magnetic tape in a phase-synchronized relation therebetween.

2. An apparatus according to claim 1, in which said phase comparing means includes means triggered by a pulse in said first control signal and a pulse in said second control signal for producing a phase difference pulse signal having a duration corresponding to the time interval between said two pulses.

* * * * *